(12) United States Patent
Calisa et al.

(10) Patent No.: US 8,155,503 B2
(45) Date of Patent: Apr. 10, 2012

(54) METHOD, APPARATUS AND SYSTEM FOR DISPLAYING VIDEO DATA

(75) Inventors: Rajanish Calisa, Artarmon (AU); Xin Yu Liu, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 763 days.

(21) Appl. No.: 12/249,501

(22) Filed: Oct. 10, 2008

(65) Prior Publication Data

US 2009/0136213 A1    May 28, 2009

(30) Foreign Application Priority Data

Nov. 27, 2007   (AU) ................................ 2007237206

(51) Int. Cl.
*H04N 9/80* (2006.01)
*H04N 5/76* (2006.01)
*H04N 5/77* (2006.01)
*H04N 5/783* (2006.01)
*H04N 7/16* (2011.01)
*H04N 7/025* (2006.01)
*H04N 7/173* (2011.01)
*G06Q 10/00* (2012.01)
*G09B 9/02* (2006.01)
*G09B 9/04* (2006.01)

(52) U.S. Cl. ........ 386/248; 386/223; 386/291; 386/343; 348/461; 348/462; 348/468; 434/29; 434/62; 705/7.26; 725/32; 725/105; 725/109; 725/112

(58) Field of Classification Search ................ 386/248, 386/223, 291, 343, E5.001; 348/461, 462, 348/468, E5.007; 434/29, 62; 705/7.26; 707/E17.028; 725/32, 105, 109, 112, 135; G09B 27/019, 27/029

See application file for complete search history.

(56) References Cited

U.S. PATENT DOCUMENTS

| 6,011,901 A | 1/2000 | Kirsten .......................... 386/123 |
| 6,993,246 B1 | 1/2006 | Pan et al. |
| 7,155,109 B2 | 12/2006 | Gates et al. ...................... 386/68 |

(Continued)

FOREIGN PATENT DOCUMENTS

EP        1 557 837 A1    7/2005

(Continued)

OTHER PUBLICATIONS

Apr. 27, 2011 European Search Report in European Patent Application No. 08170141.9.
Dec. 1, 2009 Notice of Acceptance in Australian Patent Appln. No. 2007237206.

*Primary Examiner* — Thai Tran
*Assistant Examiner* — Syed Hasan
(74) *Attorney, Agent, or Firm* — Fitzpatrick, Cella, Harper & Scinto

(57) ABSTRACT

A method (400) of displaying video data using a video recording system (100). The method (400) records a first stream of video data captured by a first camera (e.g., 103) and a first event associated with the first camera (103). The method records a second stream of video data captured by a second camera (e.g., 104) and a second event associated with the second camera (104). A playback speed is determined based at least on a difference between a current play time position and a time position of a nearest one of the first event and the second event. The first stream and the second stream of video data are displayed in a synchronized manner. The first stream of video data and the second stream of video data are displayed at the playback speed.

10 Claims, 12 Drawing Sheets

U.S. PATENT DOCUMENTS

| | | | |
|---|---|---|---|
| 2003/0177503 A1* | 9/2003 | Sull et al. | 725/112 |
| 2005/0200762 A1 | 9/2005 | Barletta et al. | 348/700 |
| 2006/0057543 A1* | 3/2006 | Roald | 434/62 |
| 2006/0195876 A1 | 8/2006 | Calisa | 725/105 |
| 2006/0227813 A1 | 10/2006 | Mavrogeanes | 370/509 |
| 2007/0183744 A1* | 8/2007 | Koizumi et al. | 386/83 |
| 2007/0280632 A1 | 12/2007 | Achillopoulos | 386/52 |
| 2009/0070163 A1* | 3/2009 | Angell et al. | 705/7 |
| 2010/0023964 A1* | 1/2010 | Basso et al. | 725/32 |

FOREIGN PATENT DOCUMENTS

| | | |
|---|---|---|
| JP | 2002-33981 A | 1/2002 |
| JP | 2005-94443 A | 4/2005 |
| JP | 2006-332839 A | 12/2006 |
| JP | 2007-288661 A | 11/2007 |
| WO | WO 02/01867 A1 | 1/2002 |
| WO | 2007/000029 A1 | 1/2007 |
| WO | 2007/097218 A1 | 8/2007 |

* cited by examiner

METHOD, APPARATUS AND SYSTEM FOR DISPLAYING VIDEO DATA

CROSS-REFERENCE TO RELATED PATENT APPLICATIONS

This application claims the right of priority under 35 U.S.C. §119 based on Australian Patent Application No. 2007237206, filed Nov. 27, 2007 which is incorporated by reference herein in its entirety as if fully set forth herein.

FIELD OF INVENTION

The present invention relates to video image processing and, in particular, to a method, apparatus and system for displaying video data. The present invention also relates to a computer program product including a computer readable medium having recorded thereon a computer program for displaying video data.

DESCRIPTION OF BACKGROUND ART

Video recording units such as Video Cassette Recorders (VCR) and digital hard disk video recorders, are well known and widely used. Video recording units are often used as part of a video recording system. Conventionally, video recording systems consist of a video recorder unit which is connected to a number of cameras (e.g., 8 or 16 cameras). The video recording unit retrieves one or more streams of video data and image data from the cameras and stores the data on hard disks or tapes. There are many uses for video recording systems including video monitoring, surveillance and security.

In recent years, video recording units have been implemented as software resident on standard personal computer platforms. Such software-implemented video recording units typically connect to one or more video cameras directly on an internet protocol (IP)-based network using standard protocols such as hyper-text transport protocol (HTTP). Video data transmitted over the network is normally in a digitized format (e.g., motion JPEG, MPEG-2, MPEG-4).

Software implemented video recording units typically support the play back of recorded video data for review purposes. Such units can optionally playback one or more streams of recorded video data, synchronously.

In a security environment, recorded streams of video data normally contain segments where no activity of interest is present. Therefore, video recording systems generally log event information upon certain activities of interest occurring. Operators of the video recording systems typically use playback controls to fast forward to the segments of video data stream where activity is present, and skip non-eventful segments of the video data stream. The disadvantage of such an approach is that there is often a huge amount of user interaction needed in order to process and review the recorded video data, which is inefficient.

SUMMARY OF THE INVENTION

It is an object of the present invention to substantially overcome, or at least ameliorate, one or more disadvantages of existing arrangements.

According to one aspect of the present invention there is provided a method of displaying video data using a video recording system, said method comprising the steps:
recording a first stream of video data captured by a first camera;
recording a first event associated with said first camera;
recording a second stream of video data captured by a second camera;
recording a second event associated with said second camera;
determining a playback speed based at least on a difference between a current play time position and a time position of a nearest one of said first event and said second event; and
displaying said first stream and said second stream of video data in a synchronized manner, wherein said first stream of video data and said second stream of video data are displayed at said playback speed.

According to another aspect of the present invention there is provided an apparatus for displaying video data using a video recording system, said apparatus comprising:
first stream recording means for recording a first stream of video data captured by a first camera;
first event recording means for recording a first event associated with said first camera;
second stream recording means for recording a second stream of video data captured by a second camera;
second event recording means for recording a second event associated with said second camera;
determining means for determining a playback speed based at least on a difference between a current play time position and a time position of a nearest one of said first event and said second event; and
display means for displaying said first stream and said second stream of video data in a synchronized manner, wherein said first stream of video data and said second stream of video data are displayed at said playback speed.

According to still another aspect of the present invention there is provided a computer readable medium, having a computer program recorded thereon, where the program is configured to make a computer execute a procedure to display video data using a video recording system, said program comprising:
code for recording a first stream of video data captured by a first camera;
code for recording a first event associated with said first camera;
code for recording a second stream of video data captured by a second camera;
code for recording a second event associated with said second camera;
code for determining a playback speed based at least on a difference between a current play time position and a time position of a nearest one of said first event and said second event; and
code for displaying said first stream and said second stream of video data in a synchronized manner, wherein said first stream of video data and said second stream of video data are displayed at said playback speed.

Other aspects of the invention are also disclosed.

BRIEF DESCRIPTION OF THE DRAWINGS

One or more embodiments of the present invention will now be described with reference to the drawings and appendices, in which.

DETAILED DESCRIPTION OF EMBODIMENTS OF THE INVENTION

Figure 1:
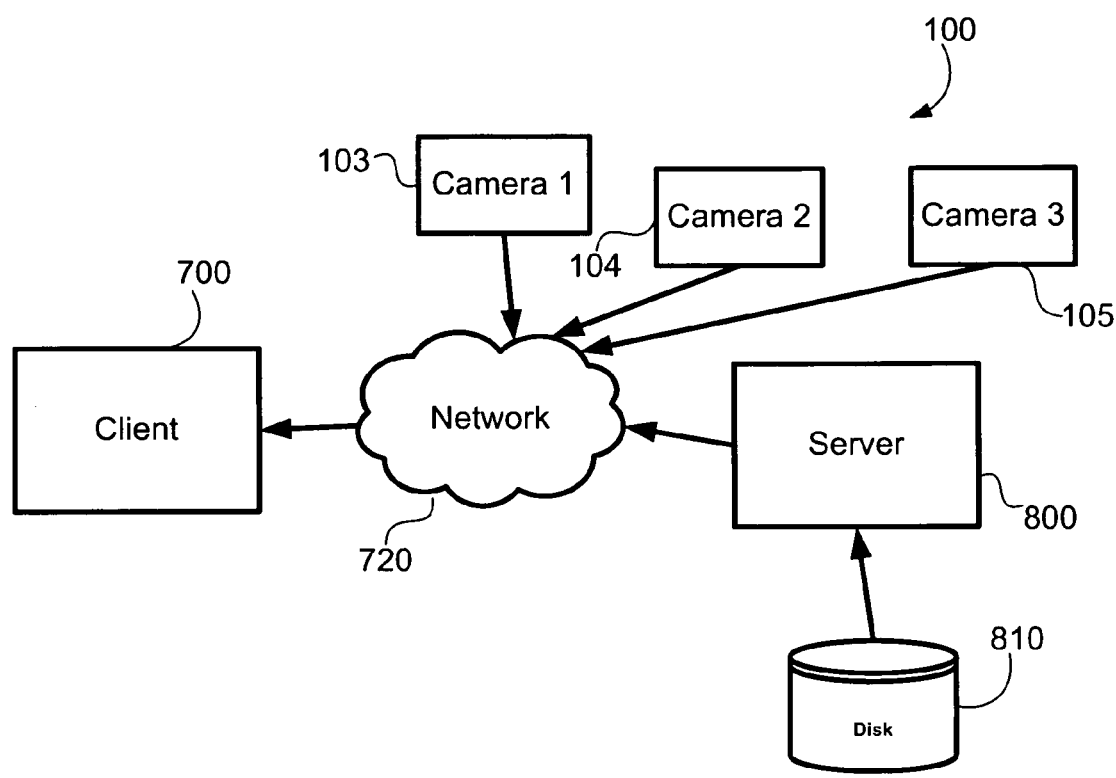
FIG. 1 is a block diagram showing a video recording system upon which embodiments described herein can be practiced.

Where reference is made in any one or more of the accompanying drawings to steps and/or features, which have the same reference numerals, those steps and/or features have for the purposes of this description the same function(s) or operation(s), unless the contrary intention appears.

A method 400 (see FIG. 4) of displaying one or more streams of video data, is described below with reference to FIGS. 1 to 8. A method 500 of transmitting streams of video data at playback speed is also described. Further, a method 600 of determining the playback speed at which the streams of video data are transmitted and displayed, will also be described. Still further, a method 900 of recording streams of video data will be described. A method 1000 of transmitting streams of video data at playback speed is also described. Still further, a method 1200 of determining playback speed will be described. In an exemplary embodiment, the methods 400, 500, 600 and 900 may be implemented within a video recording system 100, such as that shown in FIG. 1. The system 100 comprises video cameras 103, 104 and 105 connected to an IP based communications network 720, such as the Internet or an Intranet. Each of the cameras 103, 104 and 105 is independently responsible for the capture of streams of video data.

Figure 7:
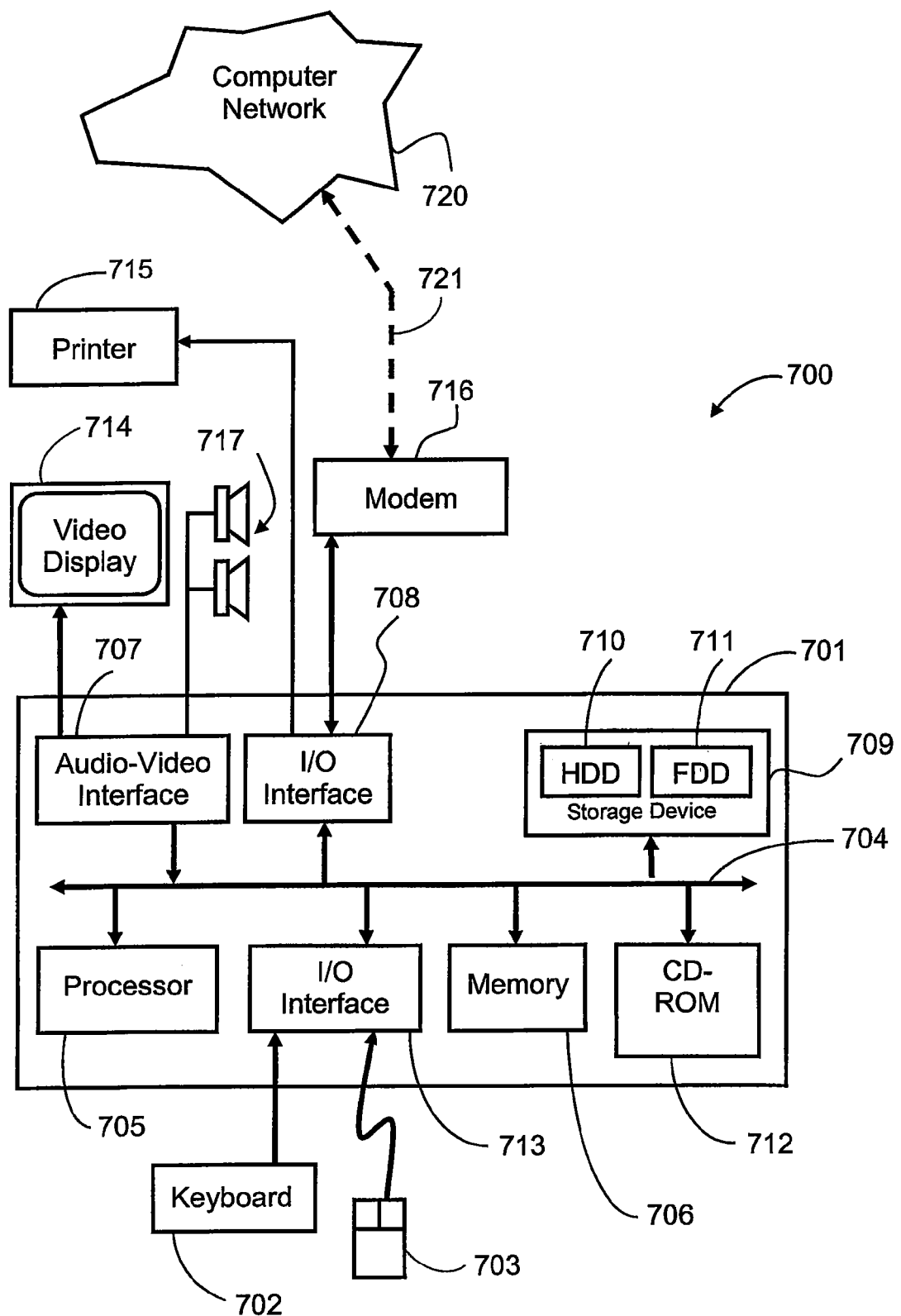
FIG. 7 is a schematic block diagram of a general-purpose computer upon which a storage server described herein can be practiced.
Figure 8:
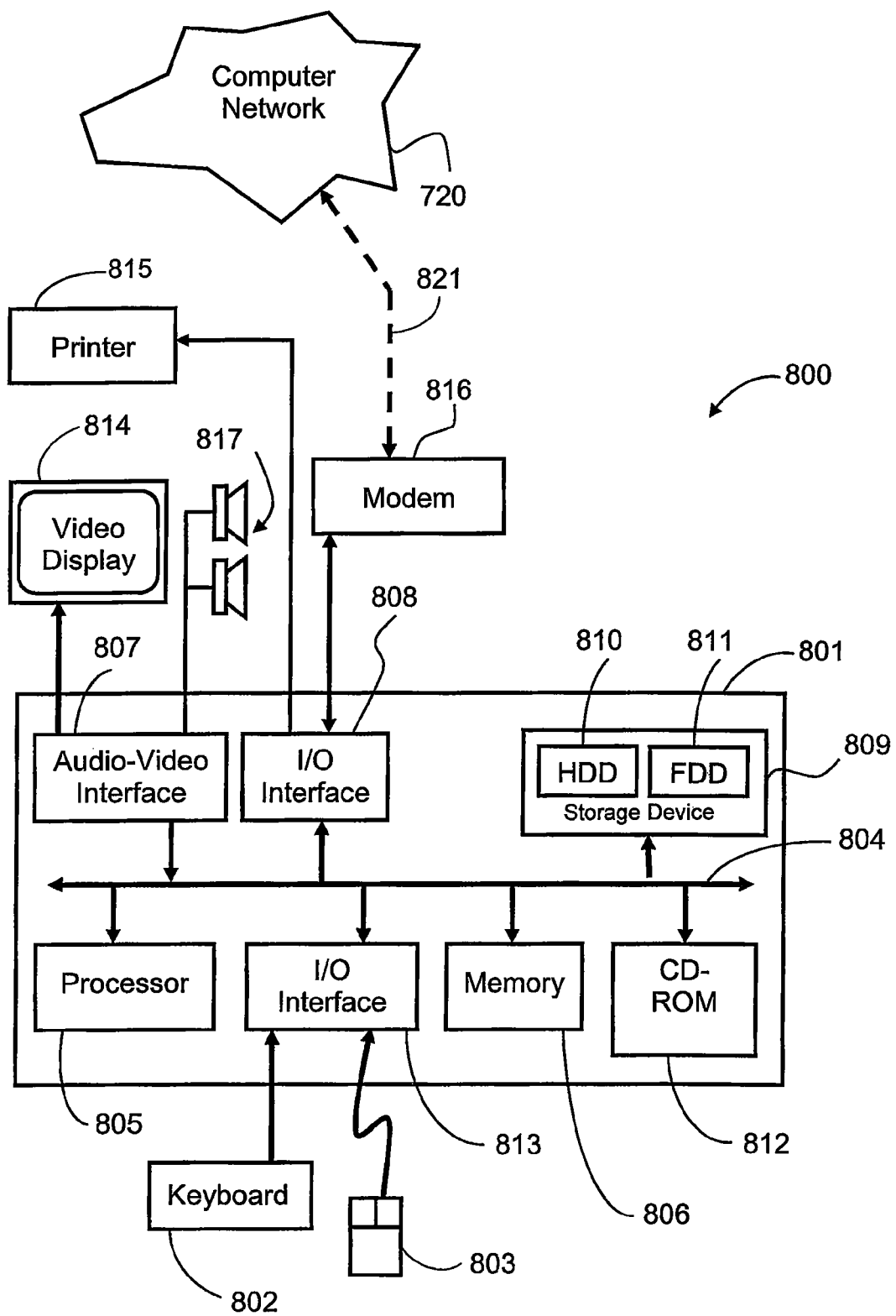
FIG. 8 is a schematic block diagram of a general-purpose computer upon which a client described herein can be practiced.
Figure 9:
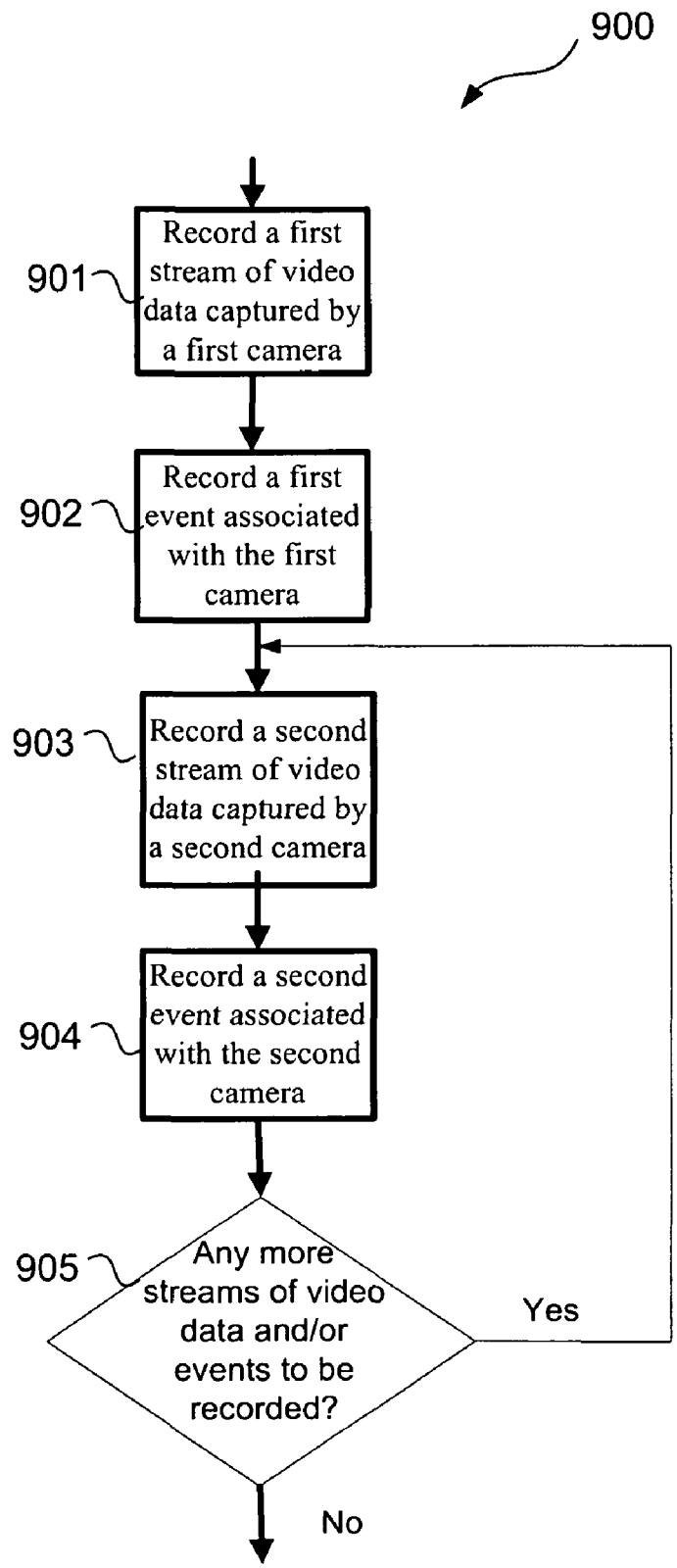
FIG. 9 is a flow diagram showing a method of recording streams of video data.

The system 100 also comprises a client 700 for processing and displaying captured streams of video data. As seen in FIG. 7, the client 700 is preferably formed by a computer module 701, input devices such as a keyboard 702 and mouse 703, and output devices including a printer 715, a display device 714 and loudspeakers 717. A Modulator-Demodulator (Modem) transceiver device 716 is used by the computer module 701 for communicating to and from the communications network 720, for example connectable via a telephone line 721 or other functional medium. The modem 716 can be used to obtain access to the communications network 720 implemented in the form of the Internet or any other network system, such as a Local Area Network (LAN) or a Wide Area Network (WAN). The modem 716 may be incorporated into the computer module 701 in some implementations.

The computer module 701 typically includes at least one processor unit 705, and a memory unit 706, for example formed from semiconductor random access memory (RAM) and read only memory (ROM). The module 701 also includes a number of input/output (I/O) interfaces including an audio-video interface 707 that couples to the video display 714 and loudspeakers 717, an I/O interface 713 for the keyboard 702 and mouse 703 and optionally a joystick (not illustrated), and an interface 708 for the modem 716 and printer 715. In some implementations, the modem 716 may be incorporated within the computer module 701, for example within the interface 708. A storage device 709 is provided and typically includes a hard disk drive 710 and a floppy disk drive 711. A magnetic tape drive (not illustrated) may also be used. A CD-ROM drive 712 is typically provided as a non-volatile source of data. The components 705 to 713 of the computer module 701 typically communicate via an interconnected bus 704 and in a manner which results in a conventional mode of operation of a computer system as known to those in the relevant art. Examples of computers on which the described arrangements can be practiced include IBM-PC's and compatibles, Sun Sparcstations or alike computer systems evolved therefrom.

The video recording system 100 also comprises a storage server 800 connected to the communications network 720. The storage server 800 is used for recording (i.e., requesting and storing) streams of video data, for accessing the streams of video data, for event handling and for the control of the system 100. The storage server 800 also stores data corresponding to events that are generated by the cameras 103, 104 and 105. The storage server 800 may also be used for creating and storing data corresponding to events such as motion detection events and sensor events. The storage server 800 is shown in detail in FIG. 8.

The storage server 800 is preferably formed by a computer module 801, input devices such as a keyboard 802 and mouse 803, and output devices including a printer 815, a display device 814 and loudspeakers 817. A Modulator-Demodulator (Modem) transceiver device 816 is used by the computer module 801 for communicating to and from the communications network 720, for example connectable via a telephone line 821 or other functional medium. The modem 816 can be used to obtain access to the Internet, and other network systems, such as a Local Area Network (LAN) or a Wide Area Network (WAN), and may be incorporated into the computer module 801 in some implementations.

Similar to the computer module 801, the computer module 801 typically includes at least one processor unit 805, and a memory unit 806, for example formed from semiconductor random access memory (RAM) and read only memory (ROM). The module 801 also includes an number of input/output (I/O) interfaces including an audio-video interface 807 that couples to the video display 814 and loudspeakers 817, an I/O interface 813 for the keyboard 802 and mouse 803 and optionally a joystick (not illustrated), and an interface 808 for the modem 816 and printer 815. In some implementations, the modem 816 may be incorporated within the computer module 801, for example within the interface 808. A storage device 809 is provided and typically includes a hard disk drive 810 and a floppy disk drive 811. A magnetic tape drive (not illustrated) may also be used. A CD-ROM drive 812 is typically provided as a non-volatile source of data. The components 805 to 813 of the computer module 801 typically communicate via an interconnected bus 804 and in a manner which results in a conventional mode of operation of such a computer system as known to those in the relevant art.

The method 400 is preferably implemented as software, such as an application program executing within the computer module 701 of the client 700. In particular, the steps of method 400 are effected by instructions in the software that is executed by the processor 705. The instructions may be formed as one or more code modules, each for performing one or more particular tasks. The software may be stored in a computer readable medium, including the storage devices described below, for example. The software is loaded into the computer module 701 from the computer readable medium, and then executed by the processor 705. A computer readable medium having such software or computer program recorded on it is a computer program product. The use of the computer program product in the computer preferably effects an advantageous apparatus for implementing the methods described herein.

The methods 500, 600 and 900 are preferably implemented as software, such as one or more application programs executing within the computer module 801 of the server 800. In particular, the steps of methods 500, 600 and 900 are effected by instructions in the software that is executed by the processor 805. The instructions may be formed as one or more code modules, each for performing one or more particular tasks. The software may be stored in a computer readable medium, including the storage devices described below, for example. The software is loaded into the computer module 801 from the computer readable medium, and then executed by the processor 805. A computer readable medium having such software or computer program recorded on it is a computer program product. The use of the computer program product in the computer preferably effects an advantageous apparatus for implementing the methods described herein.

Alternatively, the methods 400, 500, 600 and 900 may be implemented as one or more application programs executing within the same computer module.

Figure 2:
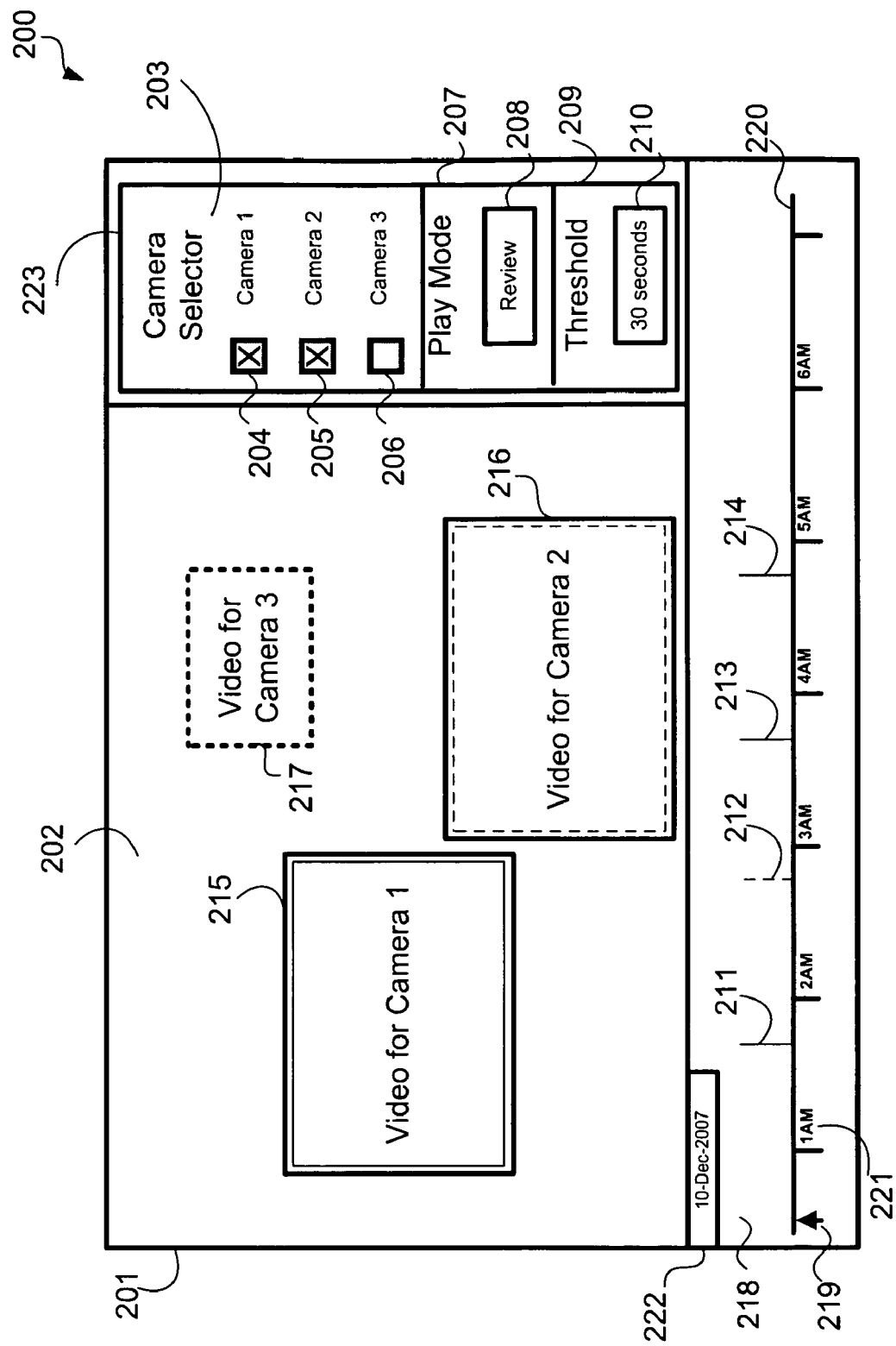
FIG. 2 is a diagram showing a window of a user interface for use with the system of FIG. 1.

The methods 400, 500, 600 and 900 will now be described in more detail by way of example. A window 201 of a client graphical user interface (GUI) 200, according to the example, is shown in FIG. 2. The window 201 contains a main layout area 202, a control panel 223 and a time line area 218. The layout area 202 contains an arbitrary number of video windows for displaying streams of video data. In the example of FIG. 2, there are three (3) video windows 215, 216 and 217.

The control panel 223 may be used to select one or more of the cameras 103, 104 and 105 for review. The control panel 223 may also be used to specify a pre-determined distance threshold value and to initiate the review of streams of video data. The control panel 201 comprises a camera selector area 203 labelled "Camera Selector". The camera selector area 203 contains three labelled camera checkboxes 204, 205 and 206 corresponding to the cameras 103, 104 and 105 available on the system 100. The camera 103 corresponds to checkbox 204 which is labelled "Camera 1". The camera 104 corresponds to checkbox 205 which is labelled "Camera 2". The camera 105 corresponds to checkbox 206 which is labelled "Camera 3". In the example of FIG. 2, the camera checkbox 204 and camera checkbox 205 are selected. Therefore, the camera 103 and camera 104 are selected for reviewing.

The control panel also contains a play mode area 207 labelled "Play Mode". The play mode area 207 has a review button 208 labelled "Review". Users can execute the method 400 and start reviewing video data by using the review button 208. In the exemplary embodiment, the review button 208 is enabled when the number of cameras selected is greater than one. Otherwise, the review button 208 is disabled.

The control panel 223 also comprises a threshold area 209 labelled "Threshold". The threshold area 209 contains an input field 210. The input field 210 may be used to specify a distance threshold value representing a period from an event at which playback of video should at least start to be slowed down. In the example of FIG. 2, the input field 210 may be used to specify the number of seconds before an event. However, the input field 210 may also be used to specify a number of minutes or other appropriate time units before an event.

The main area of the window 201 is a layout area 202 labelled "Layout". In the example of FIG. 2, the layout area 202 contains three video windows 215, 216 and 217. Each video window 215, 216 and 217 corresponds to one of the checkboxes 204, 205 and 206 in the camera selector area 203. When one of the checkboxes (e.g., 204) is selected, a second border is displayed around the corresponding video window (e.g., 215) in order to visually indicate that the window is selected. As shown in FIG. 2, the camera checkbox 204 and camera checkbox 205 are selected. Therefore, the video window 215 for "Camera 1" and the video window 216 for "Camera 2" have extra borders displayed around them so as to highlight the streams of video data being displayed within the video windows 215 and 216. Since checkbox 206 is not selected, the video window 217 for "Camera 3" does not have an extra border displayed around the window 217.

Beneath the layout area 202, the time line area 218 is displayed. The time line area 218 contains a time line 220, a play head 219 and a set of time labels 221. The play head 219 represents the position of the current play time. The time line area 218 also comprises a date indicator 222 and events 211, 212, 213, and 214. The events 211, 212, 213 and 214 are visually linked to their video windows. In particular, the pattern used to display an event corresponds to the border of the video window linked to the event. For example, the video window 215 for "Camera 1" 103 has a solid border around the window 215, and the events 211 and 213 are also solid lines. Further, the video window 216 for "Camera 2" 216 has a dashed border line corresponding to the event 212. The video window 217 for "Camera 3" 217 has a dotted line border corresponding to the event 214, which is also displayed using a dotted line. Other visual cues can also be used to link the video windows 215 to 217 to the displayed events, such as colour, tool tips or corresponding highlighting when a mouse pointer is moved over an event.

When users start to display one or more streams of video data for selected cameras, the play head 219 moves along the time line 220. The streams of video data are displayed (or played back) at particular playback speed which is reflected by the speed of movement of the play head 219. As the distance between current play time and a nearest event shorten, the playback speed of the streams of video data changes. The threshold value 210 is used to determine the speed of playback of the streams of video data for the selected cameras. Events for unselected cameras are ignored. In the example of FIG. 2, the "Camera 3" checkbox 206 is not checked. Therefore, the corresponding event 214 is excluded from the determination of playback speed.

Further, when the current play time position is near the time position of the nearest event (or first event, or next event) a stream of video data associated with that nearest event is highlighted by highlighting the video window in which that stream of video data is displayed. For example, with reference to FIG. 2, when the play head 219 is near the time position of the event 212, a stream of video data associated with the event 212 is highlighted by displaying the extra border around the video window 216 displaying that stream of video data.

Figure 3:
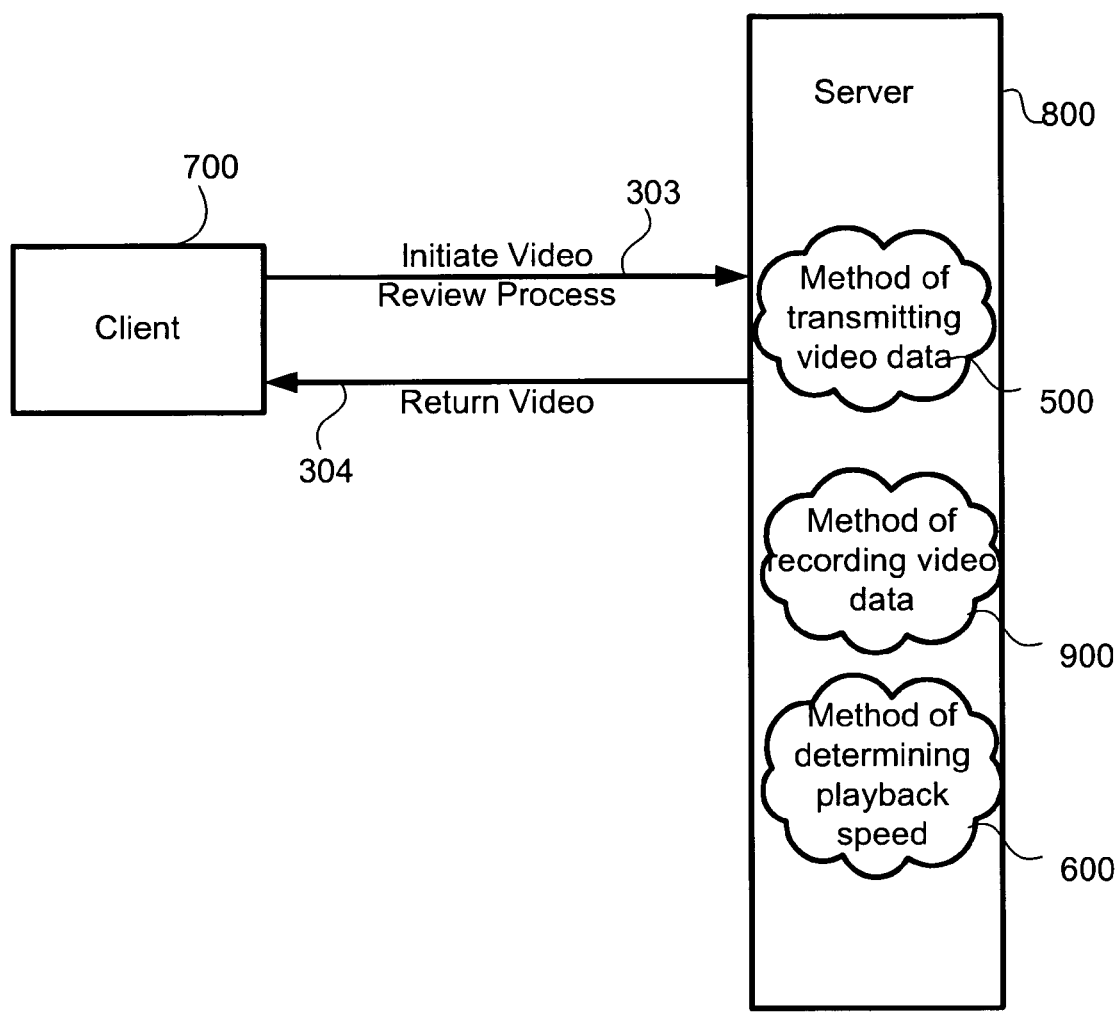
FIG. 3 is a high level block diagram describing interaction between a client and a server.

FIG. 3 is a high level block diagram showing the interaction between the client 700 and the server 800. As shown in FIG. 3, on the storage server 800, there are one or more software applications implementing the methods 500, 600 and 900. End users may use one or more other software applications resident on the client 700, to initiate the display of video data, as depicted by the arrow 303. The display of video data may by initiated by sending a message to the storage server 800 over the network 720. The storage server 800 then executes the method 500. During the execution of the method 500, the storage server 800 returns video data to the client 700 at a determined playback speed, over the same network 720, as depicted by the arrow 304. One example which allows end users to initiate the display of video data is by clicking the review button 208. The playback speed may be represented by a variable stored in the memory 806 of the server 800.

A method 900 of recording video data using the video recording system 100 will now be described with reference to the example of FIGS. 1 and 2. The steps of the method 900 may be executed for any number of streams of video data and events, over any period of time.

The method 900 begins at step 901, where the processor 805 performs the step of recording a first stream of video data captured by a first camera. For example, "Camera 1" 103 may capture the first stream of video data. The processor 805 uploads the stream of video data from the camera 103 and may store the stream of video data in the memory 806 and/or on the hard disk drive 810. At the next step 902, the processor 805 performs the step of recording a first event associated with the first camera. For example, the camera 103 may comprise a motion detector which detects a motion event at a particular time. The processor 805 downloads details of the motion event and stores details of the motion event, including the time of the event, in the memory 806 and/or on the hard disk drive 810.

The method 900 continues at the next step 903, where the processor 805 performs the step of recording a second stream of video data captured by a second camera. For example, "Camera 2" 104 may capture the second stream of video data. The processor 805 uploads the second stream of video data from the camera 104 and may store the stream of video data in the memory 806 and/or on the hard disk drive 810. At the next step 904, the processor 805 performs of the step of recording a second event associated with the second camera. For example, a door opening may be detected at a particular time. The processor 805 downloads details of this door opening event and stores details of the event, including the time of the event, in the memory 806 and/or on the hard disk drive 810.

At the next step 905, if the processor 805 determines that there are any more streams of video data and/or events to be recorded then the method 900 returns to step 903 where another stream of video data may be recorded. Otherwise, the method 900 concludes.

Figure 4:
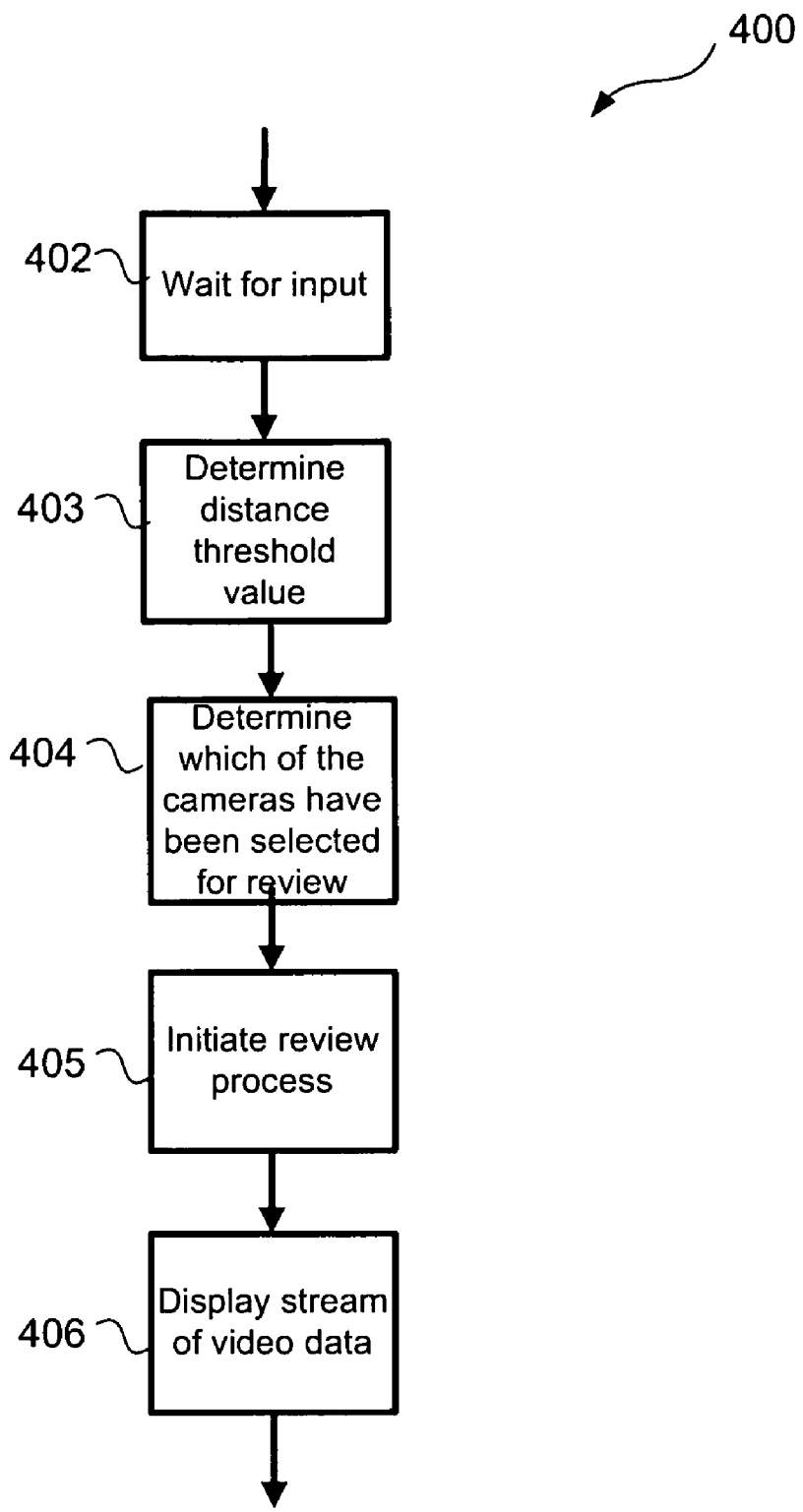
FIG. 4 is a flow diagram showing a method of displaying one or more streams of video data.

The method 400 of displaying one or more streams of video data will now be described with reference to FIG. 4. The method 400 begins at step 402, where the processor 705 waits for input from a user. In accordance with the exemplary embodiment, there are two types of inputs. One type of input is the distance threshold value which can be entered via the field 210. The other type of input is selection of one or more of the video windows (e.g., 215). The video windows can be selected by selecting one or more of the checkboxes 204, 205 or 206 in the camera selector area 203, as described above.

At the next step 403, the processor 705 determines the specified distance threshold value. After a user has specified the distance threshold value in field 210, the updated distance threshold value is stored in memory 706 by the processor 705. Accordingly, at step 403, the distance threshold value may read from memory 706. In one embodiment, the distance threshold value is automatically determined by the server 800 based upon certain properties of the events such as event priority.

Then at the next step 404, the processor 705 determines which of the cameras 103, 104 and 105 have been selected for review. Again, the cameras 103, 104 and 105 selected for review may be determined by determining which of the checkboxes 204, 205 and 206 have been selected. In the example of FIG. 2, the cameras 103 and 104 associated with the checkboxes 204 and 205 have been selected. After the processor 805 determines that a plurality of cameras 103, 104 and 105 have been selected for review, via the camera selector area 203, the processor 705 enables the review button 208.

At the next step 405, upon the processor 705 detecting selection of the review button 208, the processor 705 sends an initiate review message to the storage server 700, as depicted by the arrow 303.

Then at step 406, the processor 705 begins to receive one or more streams of video data from the storage server 800, as depicted by the arrow 304. The client 700 displays the one or more streams of video data received from the selected cameras 103, 104 and 105 in the corresponding selected video windows (e.g., 215, 216). The method 400 concludes after all of the received streams of video data have been displayed.

Figure 5:
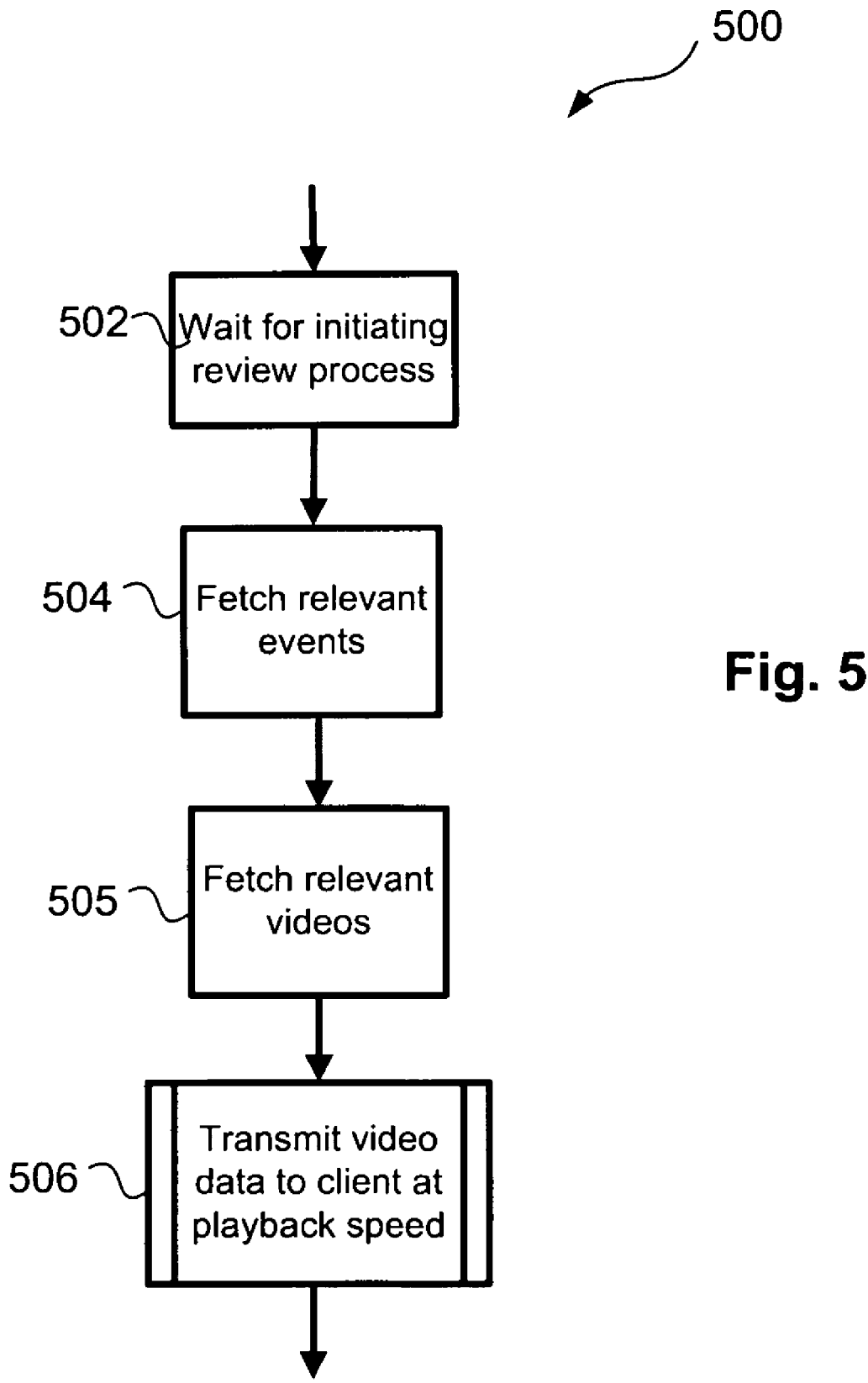
FIG. 5 is a flow diagram showing a method of transmitting streams of video data at playback speed.

The method 500 of transmitting video data will now be described with reference to FIG. 5. The method 500 begins at step 502, where the processor 805 waits to receive the initiate review message 303 from the client 700. After the storage server 800 receives the initiate review message 303 from the client 700, the method 800 proceeds to step 504 where the processor 805 fetches all event data corresponding to relevant events. The event data fetched at step 504 corresponds to the cameras 103 and 104 specified in step 404. For example, a motion detection event may have previously been determined from an analysis of one or more streams of video data captured by the camera 103. In this instance, the details of the motion detection event, including the time of the event, will be fetched by the processor 805 at step 504.

After all relevant event data has been fetched, the storage server 800 fetches all streams of video data associated with the relevant events, in the next step 505. Continuing the example, all streams of video data associated with the motion detection event related to the camera 103 will be fetched at step 505. The streams of video data and the event data may be fetched by the processor 805 from the memory 806 and/or the hard disk drive 810.

The method 500 concludes at the next step 506, where the processor 805 determines a playback speed and then transmits the video data, as a stream to the client 700 at the determined playback speed.

Figure 6:
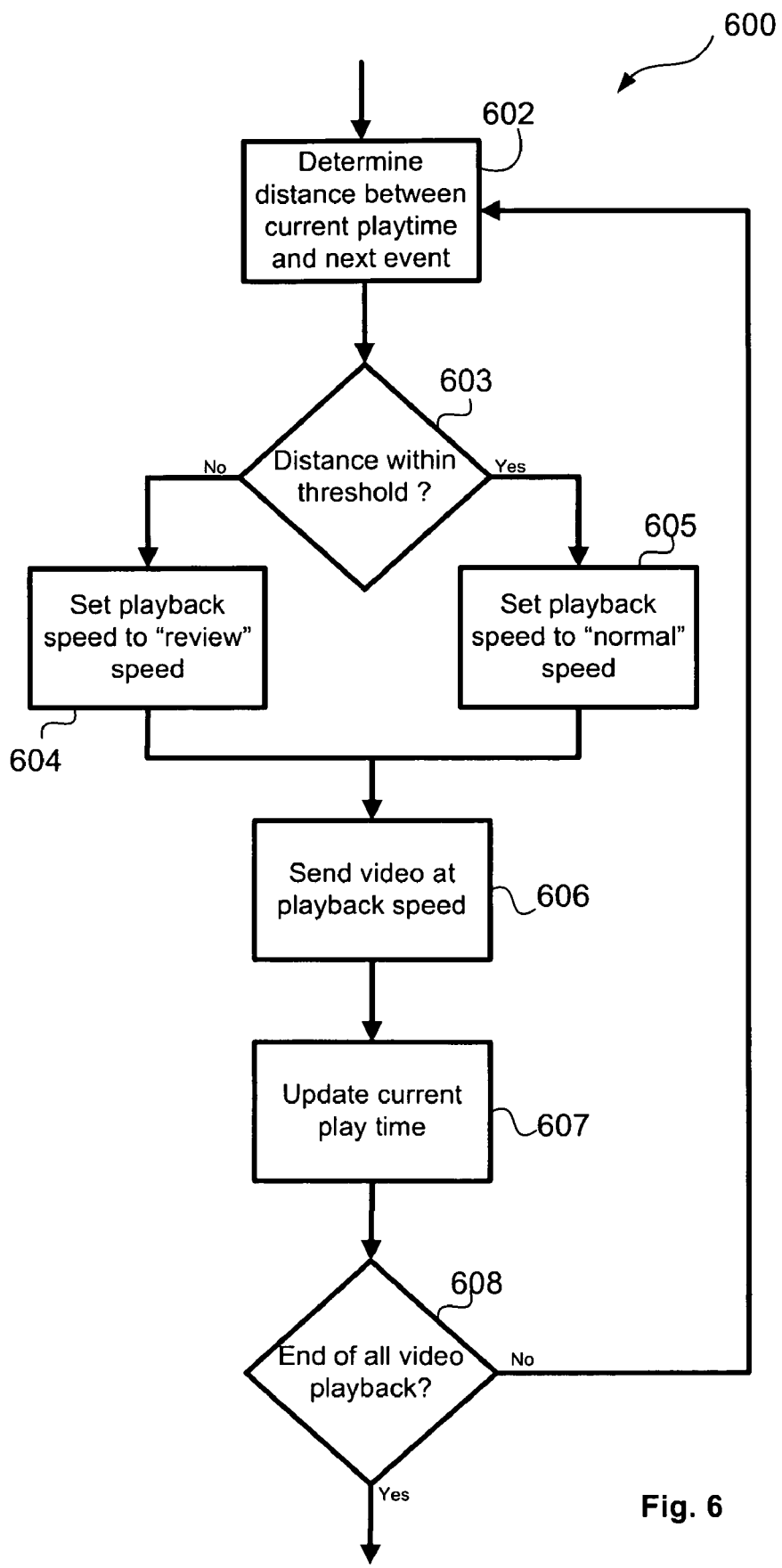
FIG. 6 is a flow diagram showing a method of determining the playback speed at which the streams of video data are transmitted and displayed.

A method 600 of determining the playback speed, as executed at step 506, will now be described in detail with reference to FIG. 6. The method 600 begins at step 602 where the processor 805 determines the distance between current play time and a next (or nearest) event. The processor 805 determines this distance by subtracting time position of the next event from the current play time position.

In step 603, if the processor 805 determines that the distance determined at step 602 is within the distance threshold value specified by the user in field 210 at step 403, then the method 600 proceeds to step 605. Otherwise, the method 600 proceeds to step 604.

At step 604, the processor 805 sets the playback speed to a first playback speed referred to as "review" playback speed. The review playback speed will be described in further detail below. The playback speed may be set at step 604 by updating the playback speed variable stored in the memory 806.

At step 605, the playback speed is adjusted (e.g., by adjusting the playback speed variable) to a second playback speed referred to as "normal" playback speed. Again, the normal playback speed will be described in further detail below. Then in step 606, the processor 805 accesses all video data for the cameras (e.g., 103 and 104) determined at step 404 and which corresponds to the current play time position. The processor 805 then transmits the accessed video data and corresponding to a unit of time (e.g., one minute) to the client 700. The accessed video data is transmitted to the client 700 at the playback speed determined at step 604 or 605. Continuing, the example described above, at step 606, the processor 805 performs the step of transmitting the first stream and the second stream of video data, to the client 700, synchronized at the determined playback speed. The processor 705 of the client 700 then performs the step of displaying the first stream and the second stream of video data on the display 714 at the determined playback speed.

Continuing the example described above, at steps 602, 603, 604 and 605, the processor 805 performs the step of determining the playback speed based at least on a difference between the current play time position and a time position of a nearest one of a first event and a second event. Then in step 606, the processor 805 performs the step of transmitting the first stream and the second stream of video data, to the client 700, synchronized at the determined playback speed. The processor 705 of the client 700 then performs the step of displaying the first stream and the second stream of video data in a synchronized manner, at the playback speed. Accordingly, the first stream of video data and the second stream of video data are displayed in a synchronized manner at the playback speed.

If at the current time, there is no available video data for one of the selected cameras, then the storage server 800 notifies the client 700 that there is no video data for that camera at the current time.

Subsequently, in step 607, the play time is moved forward according to the above unit of time. Then in step 608, if the processor 805 determines that the new play time has reached the end of the streams for video data for the selected cameras, then the method 600 concludes. Otherwise, the method 600 returns to step 602 to determine the distance between current time position and next event position.

The normal playback speed is typically real time. However, the normal playback speed may be slower than real time, for example, where a user wishes to review video data in slow motion. In another exemplary embodiment, the server 800 may determine the playback speed dynamically according to certain properties of the events, such as event priority.

The review playback speed is a variable speed and may be proportional to the distance between a next event and the current play time. For example, as the current play time position approaches the time position of an event, the playback speed may ramp down towards the normal playback speed which is slower than the review playback speed. The playback speed may get slower the closer the current play time position is to the time position of the event. While the distance of the current play time position is less than the pre-determined distance threshold value from the event, the playback speed may be set at the normal playback speed.

When the current playtime position moves past the event, at the point that the current playtime position is more than the pre-determined distance threshold value from the event, the playback speed may begin to ramp up so as to get faster. The review playback speed may be capped at a pre-determined limit. In this instance, the playback speed may only ramp up to that pre-determined speed limit.

Alternatively, the review playback speed may be a specified fixed rate. In this instance, as soon as the current playtime is greater than the pre-determined threshold distance away from an event, the playback speed may step up to the specified review playback speed.

In an alternative embodiment, the playback speed can be determined by the client 700. In this instance, the storage server 800 may return one or more streams of video data with a playback speed which is specified by the client 700, to the client 700. In still another embodiment, the client 700 and server 800 may be merged into a standalone video playback software application.

In still another embodiment, events do not have to be immediately associated with a camera 103, 104 and 105 to be displayed on the time line 220. An event which has a loose association with any of the cameras 103, 104 and 105 being reviewed can be populated on the time line 220. The populated events serve the purpose of being an additional condition for slowing down playback speed. For example, if a fire alarm on level 6 of a building was triggered, events including at least one fire alarm event will be logged. During review of video data captured by cameras on level 6, when the play head 219 approaches the fire alarm event, playback speed for all level 6 cameras will be slowed down.

Figure 10:
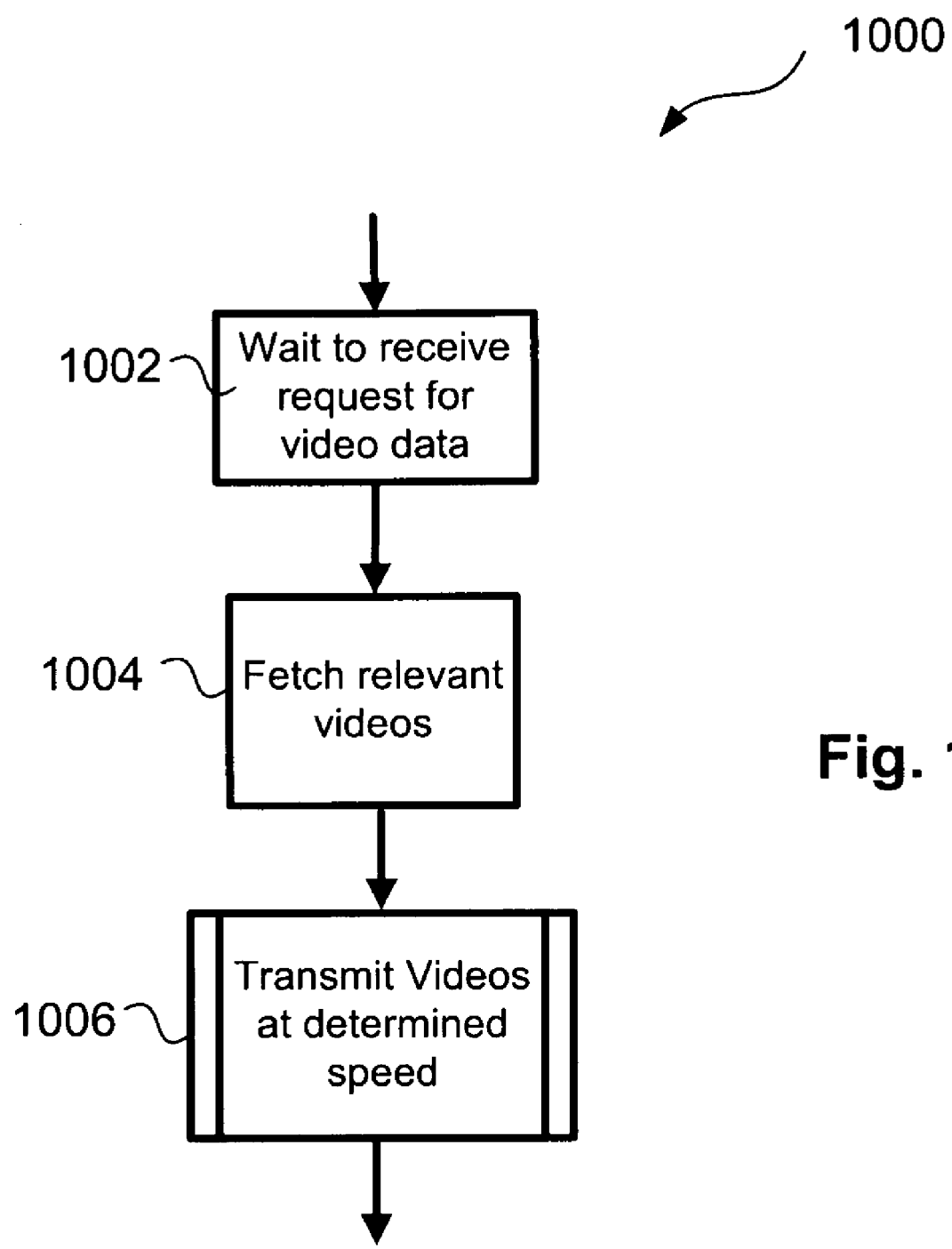
FIG. 10 is a flow diagram showing a method of transmitting streams of video data at a determined playback speed.
Figure 11:
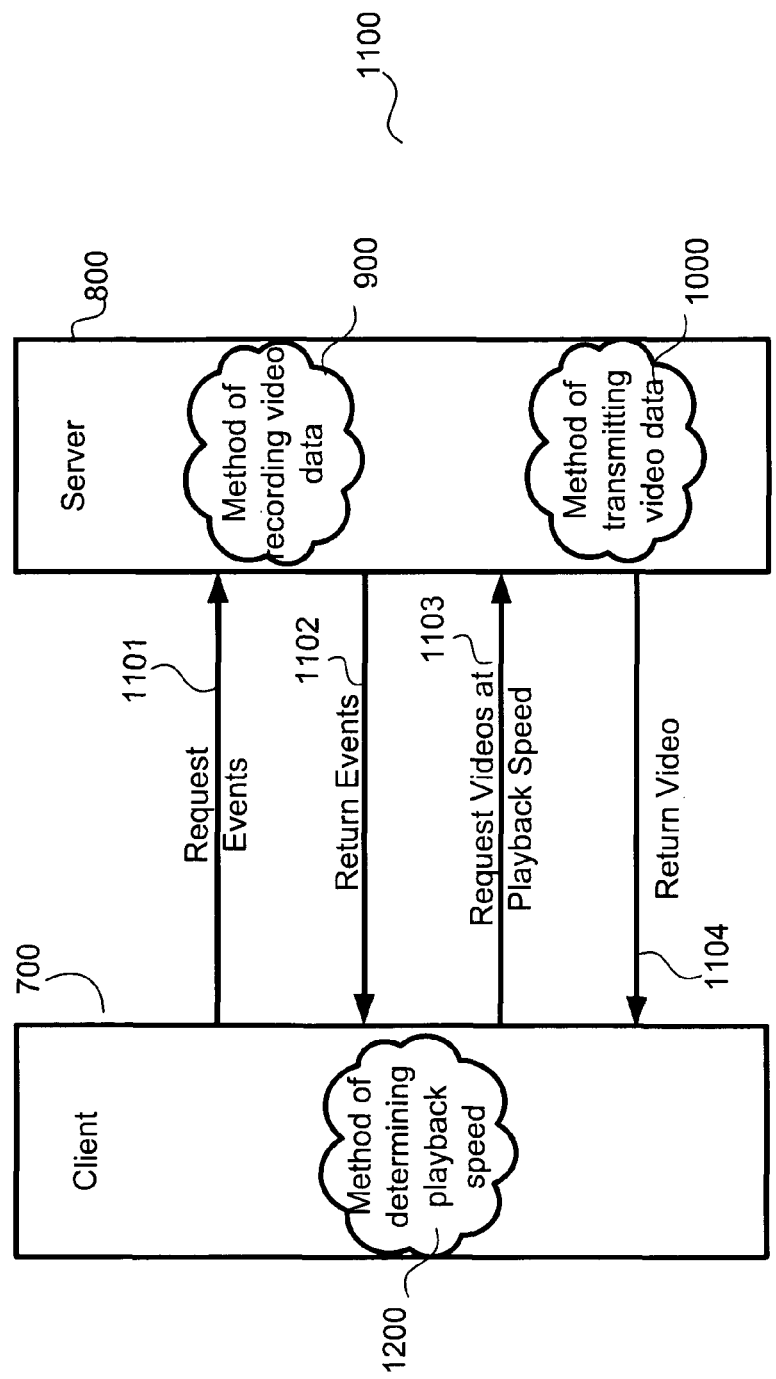
FIG. 11 is another high level block diagram describing interaction between the client and the server.

In another embodiment, as shown in FIG. 11, the client 700 may determine the playback speed and the server 800 delivers video data at the playback speed determined by the client 700. In this instance, the playback speed may be implemented as a playback speed variable stored in the memory 706 of the client 700. A method 1000 of transmitting streams of video data at a determined playback speed will be described in detail below with reference to FIG. 10. A method 1200 of determining playback speed will also be described in detail with reference to FIG. 12.

In the embodiment of FIG. 11, on the server 800, there are one or more software applications implementing the methods 900 and 1000. Another, software application implementing the method 1200 is resident on client 700. End users, using the embodiment of FIG. 11, first request events as depicted by arrow 1101. Upon receiving the request, the server 800 returns events as depicted by arrow 1102. The client then executes the method 1200 to determine the playback speeds between each event, and requests video data at the determined playback speed as depicted by the arrow 1103. The server 800 returns video data for the selected camera 103, 104 and 105 at the determined playback speed as depicted by the arrow 1104. The requests 1101 and 1103 and the responses 1102 and 1104 may be in the form of hyper-text mark-up protocol (http) request and responses.

The method 1000 of transmitting video data at the determined playback speed will now be described with reference to FIG. 10. The method 1000 begins at step 1002, where the processor 805 waits to receive a request for video data at playback speed (i.e., the playback speed represented by the playback speed variable stored in the memory 706), as depicted by the arrow 1103, from the client 700. The request 1103 includes a start and end time for the requested video data. The start time and the end time may be implemented as variables stored within the memory 706.

After the storage server 800 receives the request 1103 from the client 700, the method 800 proceeds to step 1004 where the processor 805 fetches all video data corresponding to the requested start and end time. The video data fetched at step 1004 corresponds to the cameras 103 and 104 specified in step 404 of the method 400. The method 1000 concludes at the next step 1006, where the processor 805 transmits the fetched video data (as depicted by the arrow 1104), as a stream to the client 700 at the determined playback speed. The playback speed used to transmit the video data at step 1006 is determined in accordance with the method 1200.

Figure 12:
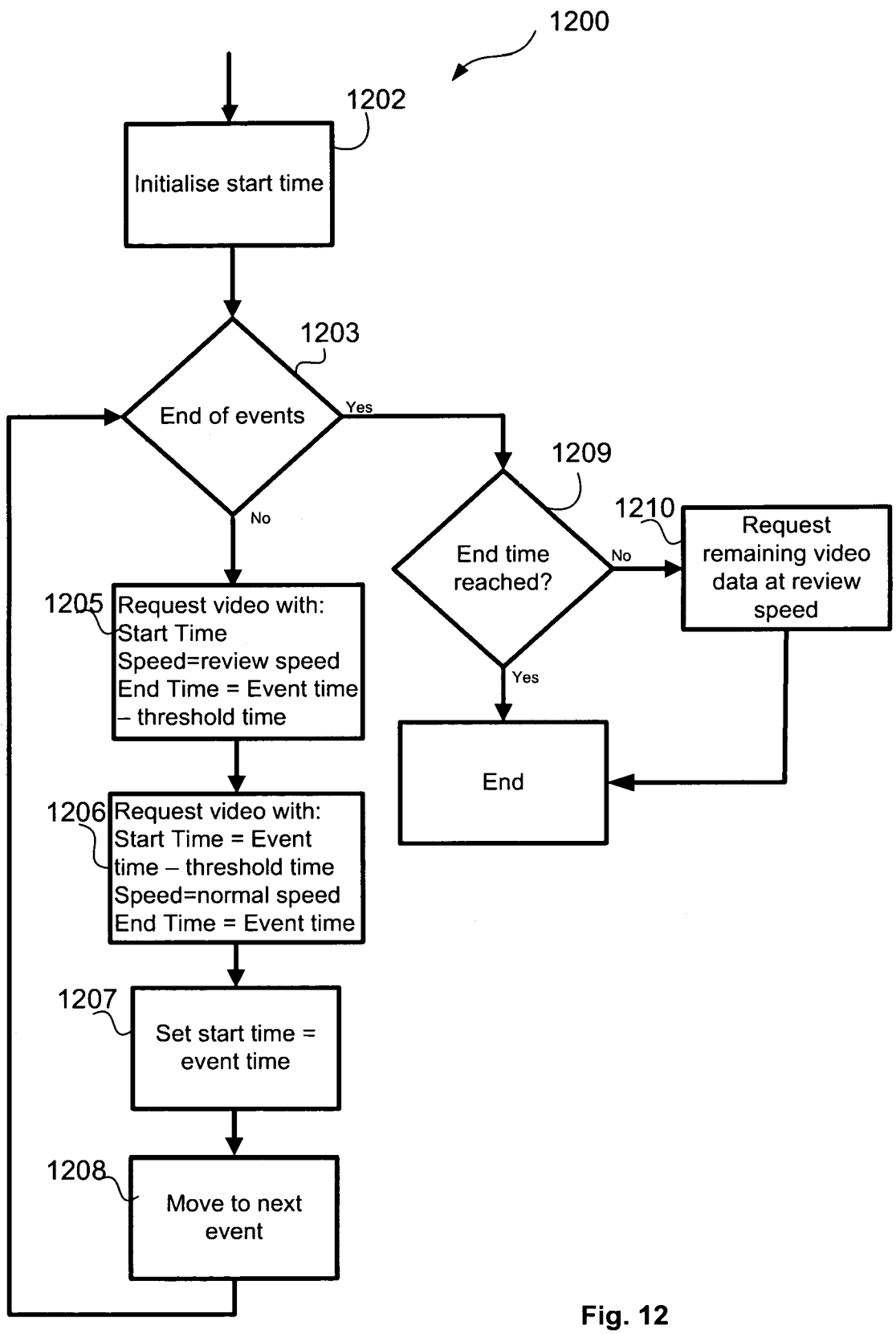
FIG. 12 is a flow diagram showing a method of determining playback speed.

The method 1200 of determining the playback speed for the video data requested at step 1002, will now be described in detail with reference to FIG. 12. As described above, the method 1200 may be implemented as software resident on the client 700 and being controlled in its execution by the processor 705.

The method 1200 begins at step 1202, where the processor 805 initialises the start time to be the beginning of video data available for the cameras 103, 104 and 105. For example, the processor 705 may initialise the start time variable stored within memory 706.

At step 1203, if the processor 805 determines that a current event is the last event, then the method 1200 proceeds to step 1209. Otherwise, the method 1200 proceeds to step 1205. For example, four events may occur within the video data available for the cameras 103, 104 and 105. As described above, the four events are displayed in the time line area 218. In the method 1200, the events are processed in chronological order so that the current event is the event displayed in the time line area that is currently being processed.

At step 1205, the processor 805 sets the playback speed to review playback speed. As described above, the review playback speed is a variable speed and may be proportional to the distance between a next event and the current play time. The playback speed may be set at step 1205 by updating the playback speed variable stored in the memory 706 of the client 700. The processor 805 also sets end time to equal "event time minus the threshold value (i.e., event time–threshold value)". Again, the end time may be set by changing the value of the end time variable stored in memory 806. Also at step 1205, the method 1200 sends the request 1103 with start time, playback speed and end time to the server 800.

At step 1206, the processor 705 resets the start time to "event time minus threshold value" to generate a "new start time". Again, the start time may be reset by changing the value of the start time variable stored in memory 706 so that the reset start time variable represents the new start time.

Also at step 1206, the processor 705 sets the playback speed to normal speed to generate a "new playback speed", and sets the end time to event time to generate a new end time. Again, the playback speed may be reset by changing the value of the playback speed variable stored in memory 706 so that the reset playback speed variable represents the new playback speed. Similarly, the end time may be set by updating the end time variable within memory 706. Normal speed is typically real time, as described above.

Also at step 1206, the processor 705 sends the request 1103, as at step 1002, with the new start time, new playback speed and new end time, to server 800. Accordingly, the request 1103 received by the storage server 800 at step 1004 includes the new start time, new playback speed and new end time as determined at step 1206.

The method 1200 continues at step 1207, where the processor 705 sets the start time to event time. At the next step 1208, the processor 705 moves to a next event.

At step 1209, if the processor 705 determines that the end time for all the video data has been reached, then the method 1200 concludes. Otherwise, the method 1200 proceeds to step 1210. At step 1210, the processor 705 sets the new start time to time of last event, end time to the end of video data and playback speed to review speed. Also at step 1210, the processor 705 requests a last segment of video data with the new start time, new end time and new playback speed. The method 1200 concludes following step 1210.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of displaying video data using a video recording system, said method comprising the steps:
    recording a first stream of video data captured by a first camera;
    recording a first event associated with the first camera;
    recording a second stream of video data captured by a second camera;
    recording a second event associated with the second camera;
    determining a playback speed based at least on a difference between a current play time position and a time position of a nearest one of the first event and the second event; and
    displaying the first stream and the second stream of video data in a synchronized manner at the determined playback speed based on the difference between the current play time and the time position of the nearest one of the first event and the second event.

2. A method according to claim 1, wherein the first stream of video data is highlighted when the current play time position is near the time position of the first event.

3. A method according to claim 1, wherein the playback speed is a variable speed.

4. A method according to claim 1, wherein the playback speed is proportional to the distance between a next event and the current play time.

5. A method according to claim 4, wherein the playback speed is capped at a pre-determined limit.

6. A method according to claim 1, wherein the playback speed is pre-determined.

7. A method according to claim 1, wherein the playback speed is a specified fixed rate.

8. An apparatus for displaying video data using a video recording system, said apparatus comprising:
    first stream recording means for recording a first stream of video data captured by a first camera;
    first event recording means for recording a first event associated with the first camera;
    second stream recording means for recording a second stream of video data captured by a second camera;
    second event recording means for recording a second event associated with the second camera;
    determining means for determining a playback speed based at least on a difference between a current play time position and a time position of a nearest one of the first event and the second event; and
    display means for displaying the first stream and the second stream of video data in a synchronized manner at the determined playback speed based on the difference between the current play time and the time position of the nearest one of the first event and the second event.

9. A non-transitory computer readable medium, having a computer program recorded thereon, where the program is configured to make a computer execute a procedure to display video data using a video recording system, the program comprising:

code for recording a first stream of video data captured by a first camera;

code for recording a first event associated with said the camera;

code for recording a second stream of video data captured by a second camera;

code for recording a second event associated with the second camera;

code for determining a playback speed based at least on a difference between a current play time position and a time position of a nearest one of the first event and the second event; and code for displaying the first stream and the second stream of video data in a synchronized manner at the determined playback speed based on the difference between the current play time and the time position of the nearest one of the first event and the second event.

10. A video recording system for displaying video data, said system comprising:

a memory for storing data and a computer program;

a processor, coupled to said memory, for executing the program, the program comprising instructions for:

(a) recording a first stream of video data captured by a first camera;

(b) recording a first event associated with the first camera;

(c) recording a second stream of video data captured by a second camera;

(d) recording a second event associated with the second camera;

(e) determining a playback speed based at least on a difference between a current play time position and a time position of a nearest one of the first event and the second event; and (f) displaying the first stream and the second stream of video data in a synchronized manner at the determined playback speed based on the difference between the current play time and the time position of the nearest one of the first event and the second event.

* * * * *